US011199640B2

United States Patent
Michael et al.

(10) Patent No.: US 11,199,640 B2
(45) Date of Patent: Dec. 14, 2021

(54) DETERMINING SEDIMENT SOURCE LOCATIONS

(71) Applicant: Saudi Arabian Oil Company, Dhahran (SA)

(72) Inventors: Nikolaos A. Michael, Abqaiq (SA); Christos Saragiotis, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 355 days.

(21) Appl. No.: 15/670,605

(22) Filed: Aug. 7, 2017

(65) Prior Publication Data
US 2019/0033477 A1   Jan. 31, 2019

(30) Foreign Application Priority Data
Jul. 27, 2017  (GR) .............................. 20170100354

(51) Int. Cl.
| | |
|---|---|
| *G01V 1/28* | (2006.01) |
| *G01N 15/08* | (2006.01) |
| *G01V 1/40* | (2006.01) |
| *G01V 1/00* | (2006.01) |
| *G01N 15/00* | (2006.01) |

(52) U.S. Cl.
CPC ............ *G01V 1/282* (2013.01); *G01N 15/08* (2013.01); *G01V 1/40* (2013.01); *G01N 15/00* (2013.01); *G01V 1/00* (2013.01); *G01V 2210/661* (2013.01)

(58) Field of Classification Search
CPC .... G01V 1/282; G01V 1/00; G01V 2210/661; G01N 15/08; G01N 15/00
USPC ......................................................... 702/2
See application file for complete search history.

(56) References Cited

U.S. PATENT DOCUMENTS

| | | | | |
|---|---|---|---|---|
| 7,433,785 | B2* | 10/2008 | Deffenbaugh | G01V 1/282 |
| | | | | 702/11 |
| 9,939,548 | B2* | 4/2018 | Burmester | G01V 3/20 |
| 10,776,718 | B2* | 9/2020 | Alexandrov | G06K 9/6247 |
| 2004/0064254 | A1* | 4/2004 | Archibald | G01V 9/007 |
| | | | | 702/2 |
| 2006/0173622 | A1* | 8/2006 | Deffenbaugh | G01V 1/282 |
| | | | | 702/2 |
| 2010/0332210 | A1 | 12/2010 | Birdwell et al. | |
| 2011/0069581 | A1* | 3/2011 | Krohn | G01V 1/364 |
| | | | | 367/43 |
| 2011/0120724 | A1* | 5/2011 | Krohn | G01V 1/30 |
| | | | | 166/369 |

(Continued)

FOREIGN PATENT DOCUMENTS

WO    WO-8202573 A1 *  8/1982 ............. E21B 37/00

OTHER PUBLICATIONS

J. Zawiejska and et al, "Variation in surface bed material along a mountain river modified by gravel extraction and channelization, the Czarny Dunajec,Polish Carpathians", Geomorphology 231, 2015, pp. 353-366 (Year: 2015).*

(Continued)

*Primary Examiner* — Douglas Kay
(74) *Attorney, Agent, or Firm* — Fish & Richardson P.C.

(57) ABSTRACT

For a specified stratigraphic interval, well data is received for a plurality of wells. An average grain size for each of the plurality of wells is determined based on the received data. A location or multiple locations of a grain source is determined based on the average grain sizes for the stratigraphic interval.

17 Claims, 10 Drawing Sheets

(56) References Cited

U.S. PATENT DOCUMENTS

| | | | | |
|---|---|---|---|---|
| 2013/0056201 | A1* | 3/2013 | Chandler, Jr. | E21B 49/02 166/254.2 |
| 2015/0241591 | A1* | 8/2015 | Burmester | G01V 3/20 702/7 |
| 2015/0355158 | A1* | 12/2015 | Lander | G01N 33/383 702/2 |
| 2018/0060758 | A1* | 3/2018 | Alexandrov | G06F 17/16 |
| 2018/0156937 | A1* | 6/2018 | Wyatt | G01V 5/12 |
| 2019/0257810 | A1* | 8/2019 | Lander | G01N 33/24 |

OTHER PUBLICATIONS

B. Camenen and et al, "On the estimation of the bed-material transport and budget along a river segment: application to the Middle Loire River, France", AquatSci, 2016, 78, pp. 71-81 (Year: 2016).*

N. Michael, "Functioning of an ancient routing system, the Escanilla Formation, South Central Pyrenees", Earth Sciences and Engineering Imperial College London, PhD Thesis, Feb. 2013 (Year: 2013).*

Camenen et al., "On estimation of the bed-material transport and budget along a river segment: application to the Middle Loire River, France," Aquatic Sciences, vol. 78, No. 1, Oct. 28, 2015, 11 pages.

Constantine et al., "Examining the physical meaning of the bank erosion coefficient used in meander migration modeling," Geomorphology, vol. 106, No. 3-4, May 15, 2009, 11 pages.

Johnson et al., Experimental tsunami deposits: Linking hydrodynamics to sediment entrainment, advection lengths and downstream fining, Geomorphology, vol. 253, Nov. 6, 2015, 13 pages.

Rice et al., "Grain size along two gravel-bed rivers: statistical variation, spatial pattern and sedimentary links," Earth Surface processes and Landforms, vol. 23, No. 4, Apr. 1, 1998, 19 pages.

Zawiejska et al., "Variation in surface bed material along a mountain river modified by gravel extraction and channelization, the Czarny Dunajec, Polish Carpathians," Geomorphology, vol. 231, Dec. 23, 2014, 14 pages.

International Search Report and Written Opinion issued in International Application No. PCT/US2018/043273 dated Nov. 8, 2018,.

Allen et al., "The Qs problem: Sediment volumetric balance of proximal foreland basin systems," Sedimentology, vol. 60, ISSN: 0037-0746, Published in 2013, pp. 102-130.

Michael et al., "The Functioning of Sediment Routing Systems Using a Mass Balance Approach: Example from the Eocene of the Southern Pyrenees," Journal of Geology, vol. 121, ISSN: 0022-1376, Oct. 2013, pp. 581-606.

Richards et al., "Delineating Source Areas for Runoff in Depressional Landscapes: Implications for Hydrologic Modeling," J. Great Lakes Res. 30(1), Published in 2004, pp. 9-21.

Whittaker et al., "Decoding downstream trends in stratigraphic grain size as a function of tectonic subsidence and sediment supply," Geological Society of America Bulletin, vol. 123, ISSN: 0016-7606, Jul.-Aug. 2011, pp. 1363-1382.

Gulf Cooperation Council Examination Report issued in GCC Application No. GC 2018-35723 dated Dec. 27, 2019, 5 pages.

Gulf Cooperation Council Examination Report issued in GCC Application No. GC 2018-35723 dated Mar. 31, 2020, 4 pages.

GCC Examination Report in Gulf Cooperation Council Appln. No. GC 2018-35723, dated Aug. 20, 2020, 4 pages.

EP Communication Pursuant to Article 94 (3) EPC issued in European Appln. No. 18752924.3, dated Mar. 2, 2021, 12 pages.

* cited by examiner

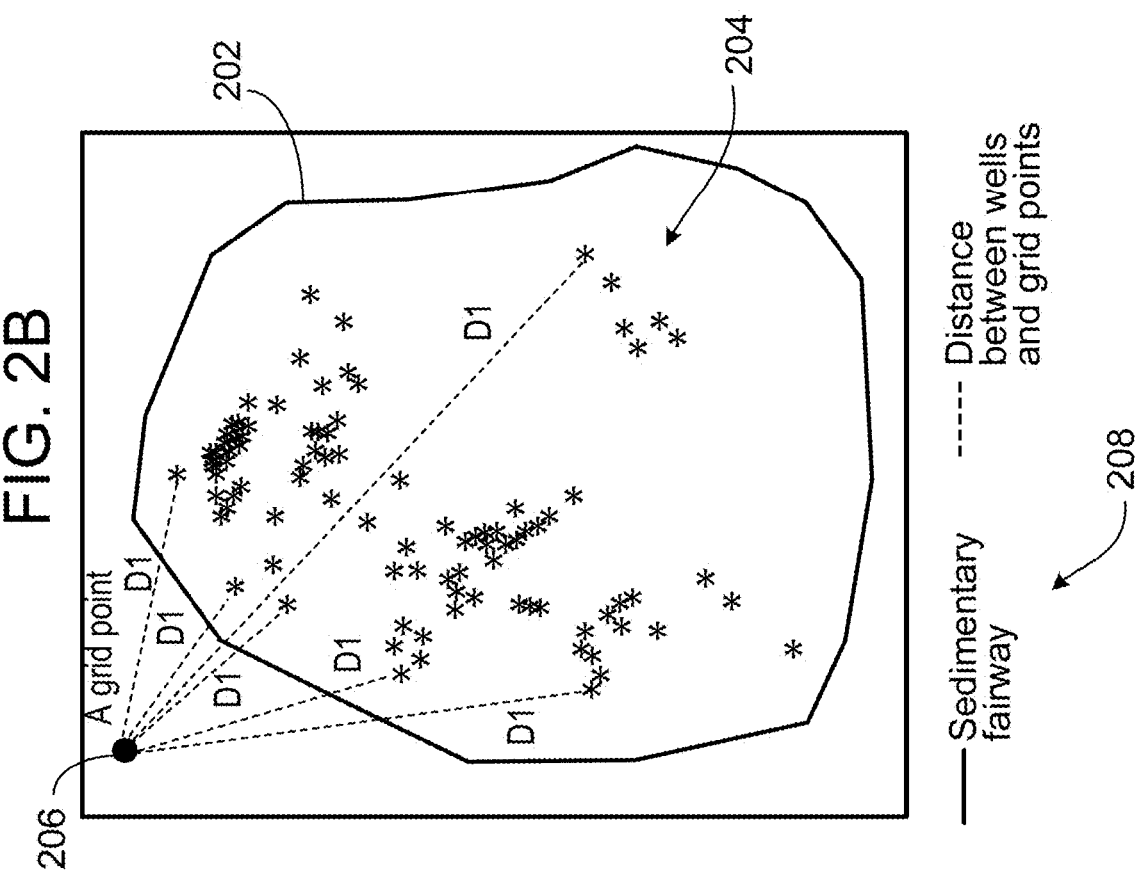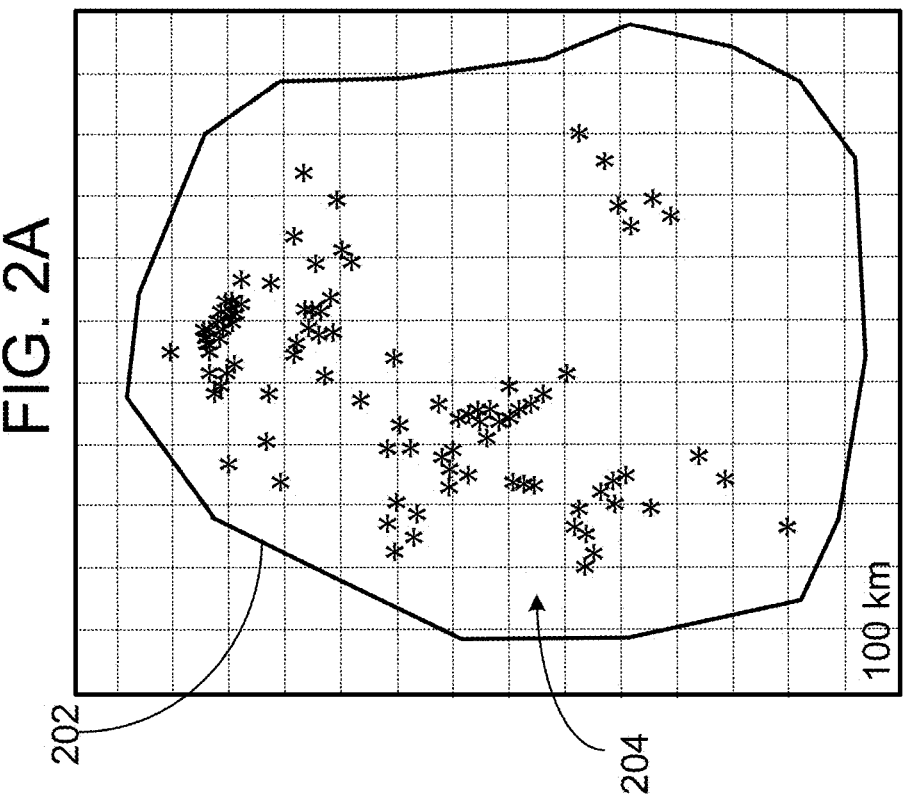

DETERMINING SEDIMENT SOURCE LOCATIONS

CROSS-REFERENCE TO RELATED APPLICATION(S)

This application claims the benefit of priority to Greek International Patent Application Serial No. 20170100354, filed Jul. 27, 2017 and entitled "DETERMINING SEDIMENT SOURCE LOCATIONS". The contents of which are hereby incorporated by reference.

TECHNICAL FIELD

This disclosure relates to sedimentology.

BACKGROUND

In sedimentology, the distribution and spread of various facies and types of sediment are studied. The information learned in sedimentology can be used to map geologic formations.

SUMMARY

This disclosure describes technologies relating to determining sediment source locations.

An example implementation of the subject matter described within this disclosure is a method with the following features. For a specified stratigraphic interval, well data is received for a plurality of wells. An average grain size for each of the plurality of wells is determined based on the received data. A location of a grain source is determined based on the average grain sizes for the stratigraphic interval.

Aspects of the example method, which can be combined with the example implementation alone or in combination, include the following. Determining an average grain size for each well includes determining ratios of each of a plurality of grain size classes in the specified stratigraphic interval.

Aspects of the example method, which can be combined with the example implementation alone or in combination, include the following. The ratios of each of the plurality of grain size classes are determined based on a total thickness of grains of that grain size class divided by a total thickness of the specified stratigraphic interval.

Aspects of the example method, which can be combined with the example implementation alone or in combination, include the following. Determining the grain source location includes using an exponential-decay equation. The average grain size exponentially decreases as a distance from the grain source increases.

Aspects of the example method, which can be combined with the example implementation alone or in combination, include the following. A plurality of grain source locations is iteratively determined based on the average grain sizes of the stratigraphic interval. The plurality of grain source locations includes the location of the grain source.

Aspects of the example method, which can be combined with the example implementation alone or in combination, include the following. The plurality of wells includes at least thirty wells.

Aspects of the example method, which can be combined with the example implementation alone or in combination, include the following. A well is drilled at a location near the location of the grain source for a future well.

An example implementation of the subject matter described within this disclosure is a non-transitory computer readable medium storing instructions to cause a processor to perform operations with the following features. For a specified stratigraphic interval, well data is received for a plurality of wells. An average grain size is determined for each of the plurality of wells based on the received data. A location of a grain source is determined based on the average grain sizes for the stratigraphic interval.

Aspects of the example non-transitory computer readable medium, which can be combined with the example implementation alone or in combination, include the following. Determining an average grain size for each well includes determining ratios of each of a plurality of grain size classes in the specified stratigraphic interval.

Aspects of the example non-transitory computer readable medium, which can be combined with the example implementation alone or in combination, include the following. The ratios of each of the plurality of grain size classes is determined based on a total thickness of grains of that grain size class divided by a total thickness of the specified stratigraphic interval.

Aspects of the example non-transitory computer readable medium, which can be combined with the example implementation alone or in combination, include the following. Determining the grain source location includes using an exponential-decay equation. The average grain size exponentially decreases as a distance from the grain source increases.

Aspects of the example non-transitory computer readable medium, which can be combined with the example implementation alone or in combination, include the following. A plurality of grain source locations is iteratively determined based on the average grain sizes of the stratigraphic interval. The plurality of grain source locations includes the location of the grain sources.

Aspects of the example non-transitory computer readable medium, which can be combined with the example implementation alone or in combination, include the following. The plurality of wells comprises at least thirty wells.

Aspects of the example non-transitory computer readable medium, which can be combined with the example implementation alone or in combination, include the following. A well is drilled at a location near the location of the grain source for a future well.

An example implementation of the subject matter described within this disclosure is a second method with the following features. For a specified stratigraphic interval, well data is received for a plurality of wells. An average grain size is determined for each of the plurality of wells based on the received data. A location of a grain source is determined based on the average grain sizes for the stratigraphic interval. The average grain size exponentially decreases as a distance between one of the plurality of wells and the grain source increases. A plurality of grain source locations is iteratively determined based on the average grain sizes of the stratigraphic interval. The plurality of grain source locations includes the location of the grain source. A well is drilled at an optimum location determined by the location of the grain source for a future well.

Aspects of the example second method, which can be combined with the example implementation alone or in combination, include the following. Determining an average grain size for each well comprises determining ratios of each of a plurality of grain size classes in the specified stratigraphic interval.

Aspects of the example second method, which can be combined with the example implementation alone or in combination, include the following. The plurality of wells comprises at least thirty wells.

Aspects of the example second method, which can be combined with the example implementation alone or in combination, include the following. For a second stratigraphic interval, a second set of well data for the plurality of wells is received. A second average grain size for each of the plurality of wells is determined based on the received data. A second plurality of grain source locations is iteratively determined based on the average grains sizes of the second stratigraphic interval. The plurality of grain source locations includes the location of the grain source. A well is drilled at a location near the location of the second grain source for a future well.

Particular implementations of the subject matter described in this disclosure can be implemented so as to realize one or more of the following advantages. Knowing the location of sediment sources can help locate hydrocarbon reservoir facies. In addition, aspects of the subject matter can improve reservoir modeling and an understanding of sedimentary systems.

The details of one or more implementations of the subject matter described in this disclosure are set forth in the accompanying drawings and the description below. Other features, aspects, and advantages of the subject matter will become apparent from the description, the drawings, and the claims.

BRIEF DESCRIPTION OF THE DRAWINGS

FIGS. 2A-2B are graphs of a production basin showing locations of wells within the basin.

Like reference numbers and designations in the various drawings indicate like elements.

DETAILED DESCRIPTION

This disclosure describes a method for finding siliciclastic sedimentary sources within a geologic formation. The method involves taking well data from specific stratigraphic intervals of interest across an entire basin or an area of interest, and providing an estimation of a single or multiple source locations based on the sedimentary trends between wells. Well data can be taken from cuttings, core samples, or any other data within the specified geologic interval. A distribution of grain-sizes is initially determined at a specified stratigraphic interval for each well, and an average grain size is determined for each well at the specified stratigraphic interval. Source locations can be determined at a basin level based on this data.

Figure 1:
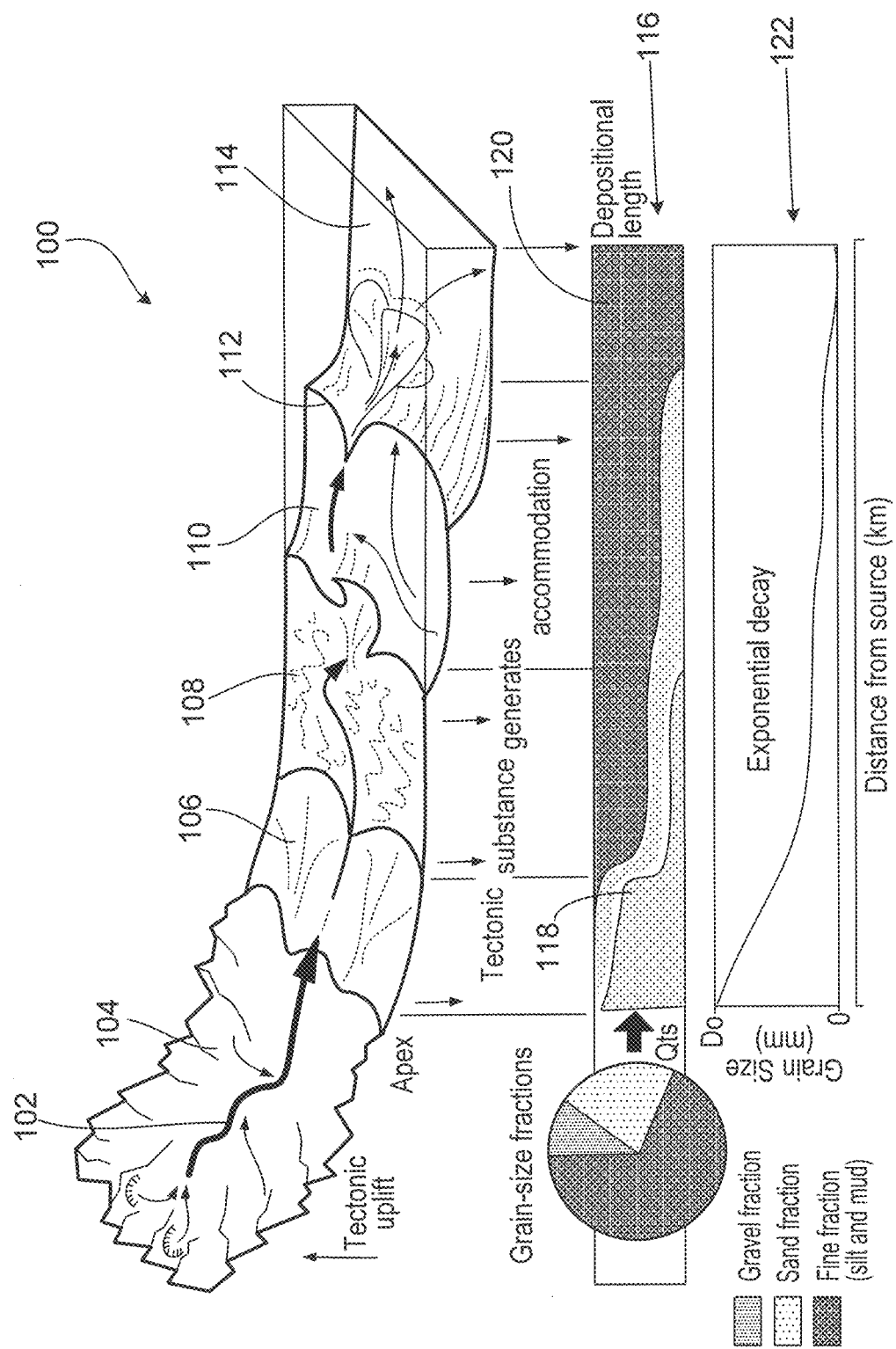
FIG. 1 is a diagram demonstrating grain-size fraction distribution.

FIG. 1 illustrates a typical progression of different types and sized grains in a geologic formation 100. The illustrated geologic formation 100 includes a sediment flow 102 that contains a variety of rock grains, or simply "grains" in the context of this disclosure, of various sizes, shapes, and types. The different types of grains can be categorized into different facies such as sand or fines. The sediment flow 102 starts at a catchment 104 and flows through a gravel alluvial fan 106, an alluvial plain 108, a costal fence 110, and a shelf-slope break 112 before settling in a deep marine basin 114. As the sediment flow 102 passes through these various zones, different sized grains can drop out of the sediment flow 102. As a general rule, the larger, heavier, and coarser particles typically drop out of the flow 102 earlier than the smaller, lighter, finer particles, such as sand. Cross-section 116 illustrates an example division between gravel 118 and sand 120 as the flow 102 continues away from its source. For example, the gravel alluvial fan 106 can contain a greater total number of gravel-sized grains than the deep marine basin 114. In some cases, the average grain size can decrease according to an exponential-decay equation, that is, the average grain size can exponentially decrease as the flow 102 continues away from the grain source. In these instances, as described later within this disclosure, the exponential decay can be used to determine a grain source location.

FIG. 2A illustrates an example production basin 202 with multiple wells 204 plotted onto a grid with Cartesian coordinates. The Cartesian grid can have a fine or coarse resolution depending on the desired speed and accuracy of the computations. The Cartesian grid is primarily used to determine distances, each grid point is a potential source location and can be assigned an initial, or at the source, assumed average grain size. Further details on the process of assigning an initial, or at the source, grain size are explained in greater detail later within this disclosure. Referring to the legend 208, a well is shown as an asterisk, a grid point 206 is shown as a circle, the sedimentary fairway (the edge of the basin 202) is illustrated by a solid line, and a first distance (D1) is shown as a straight line. The production basin 202 can include multiple wells 204, for example at least thirty wells. Well samples can be taken from one or more of the multiple wells 204 and analyzed to determine a grain size distribution in each well. The well samples can include cuttings, core samples, or any other sample of petrophysical log data of sufficient size to be representative of the formation or stratigraphic layer. As a reminder, the previously described process is for a single stratigraphic layer within each well.

FIG. 2B demonstrates how distances can be calculated between each grid point 206 and each of the wells 204. The distances can be calculated in any number of ways, for example, using the Pythagorean Theorem. In addition, an initial grain size can be assigned to each grid location for the specified stratigraphic interval. This initial grain size ($GS_0$) can be dependent upon the data and is larger than the maximum average grain size observed in a dataset. The maximum average size can be dependent upon the expected grain type, for example, the maximum grain size for sand can be 2 millimeters, while an average grain size for a conglomeratic system at the source can be 40 millimeters. Collecting and developing a dataset is explained in greater detail below. The dataset will include a $GS_0$ for each grid point and well location. In the case of a well, the $GS_0$ is determined empirically, while the $GS_0$ for each grid point can be assumed. $GS_0$ can vary depending on the system and the types of grains observed in the wells 204. For example, in conglomerate-dominated environments, an averaged $GS_0$ of 40 mm can be used. In sandier systems, $GS_0$ can be 2 mm.

A dataset can be constructed by taking a sample from each of the wells 204 that includes lithological information and determining an average grain size for each well. Samples can include cuttings, core samples, or any other sample of petrophysical log data measured or derived where lithology can be estimated containing a sufficient sample size to be representative of a specified stratigraphic interval for each well. The average grain size of each well at a specified stratigraphic interval can be determined with the following equation:

$$\overline{GS} = \% \text{ Conglomerate} * \overline{GS} G + \% \text{ Sand} * \overline{GS} S + \% \text{ vfSand} * \overline{GS} vfS + \% \text{ Silt} * \overline{GS} \text{Silt} + \% \text{ Fines} * \overline{GS} F \quad \text{(Eq. 1)}$$

Where $\overline{GS}$ is an average grain size of the well, $\overline{GS}C$, $\overline{GS}S$, $\overline{GS}vfS$, $\overline{GS}Silt$, $\overline{GS}F$ are specific averaged grain sizes in the well and for a specific interval and of specific litho-types: conglomerate, sand, very fine sandstone, silt and other fines (including claystone), % Conglomerate is the percentage of conglomerate in the well for the specific interval, % Sand, % vfSand, % Silt, and % Fines are the percentages of the respective litho-types for the specific interval in the well. The ratios of each of the grain sizes can be determined based on a total number (thickness) of grains/litho-types of that grain size divided by a total number of grains (thickness of the geologic formation).

Figure 3:
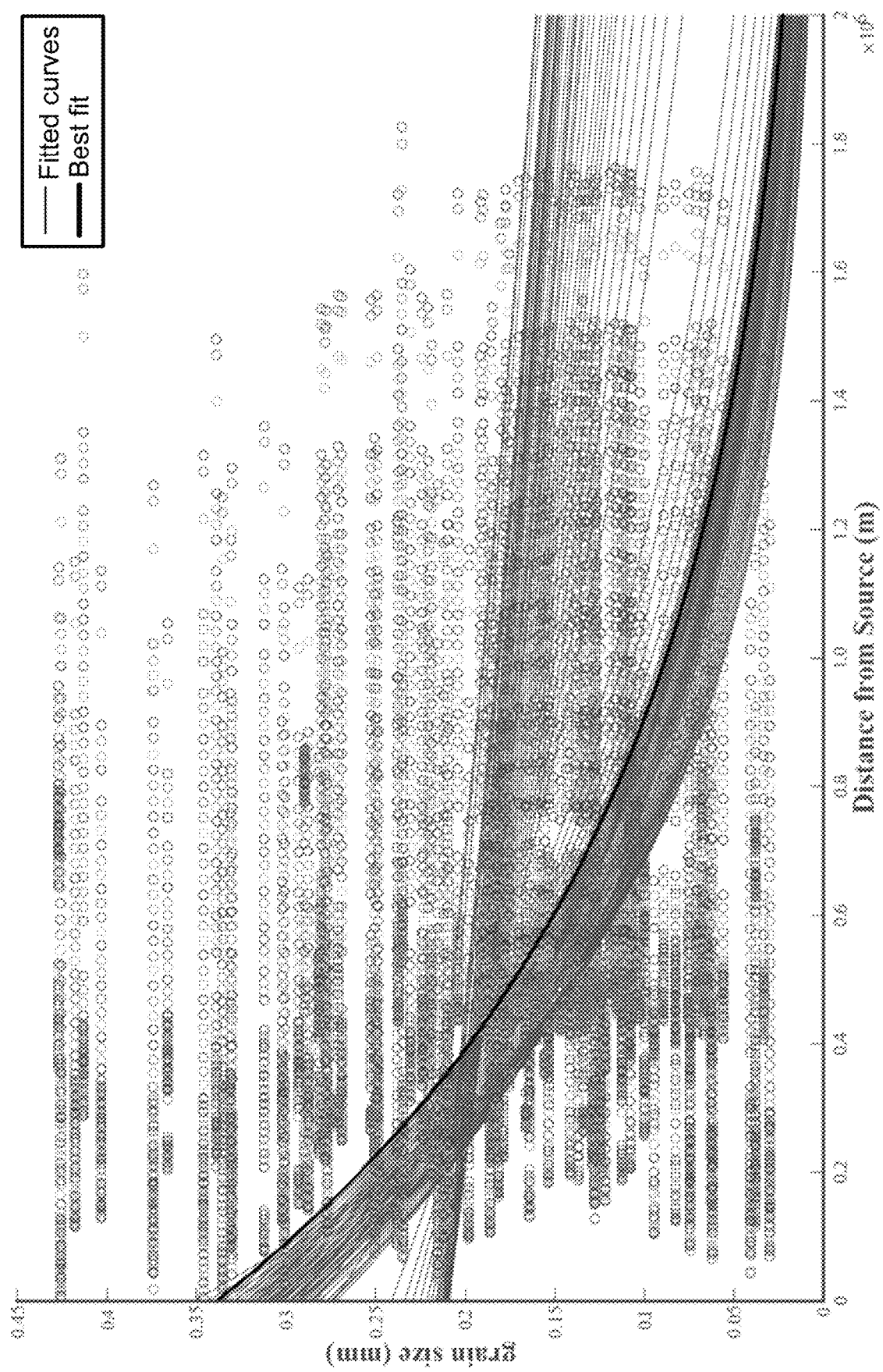
FIG. 3 is a plot of average grain size distributions vs. distance from a source.

FIG. 3 illustrates example results of applying a regression analysis on the dataset constructed based on the sample from each well at the specified stratigraphic interval. As previously described, larger grains can fall out of the grain flow 102 as it progresses from a grain source to a well. In some cases, the average grain size of the flow 102 decreases exponentially as the flow 102 gets farther from the grain source. In these instances, the average grain size can change based on the following equation:

$$D_x = D_0 * e^{\wedge}(-a * x) \quad \text{(Eq. 2)}$$

Where "$D_x$" is the average grain size at a specified distance "x" from the sediment source, "$D_0$" is the average grain size at the sediment source, and "a" is a coefficient specific to the geologic formation that is determined by fitting the exponential curve to the data. Using the dataset from the well samples and Eq. 2, a regression analysis can be run to determine best-fit curve showing a relationship between grain size and the distance from a potential source location. Such results are plotted in FIG. 3.

Figure 4:
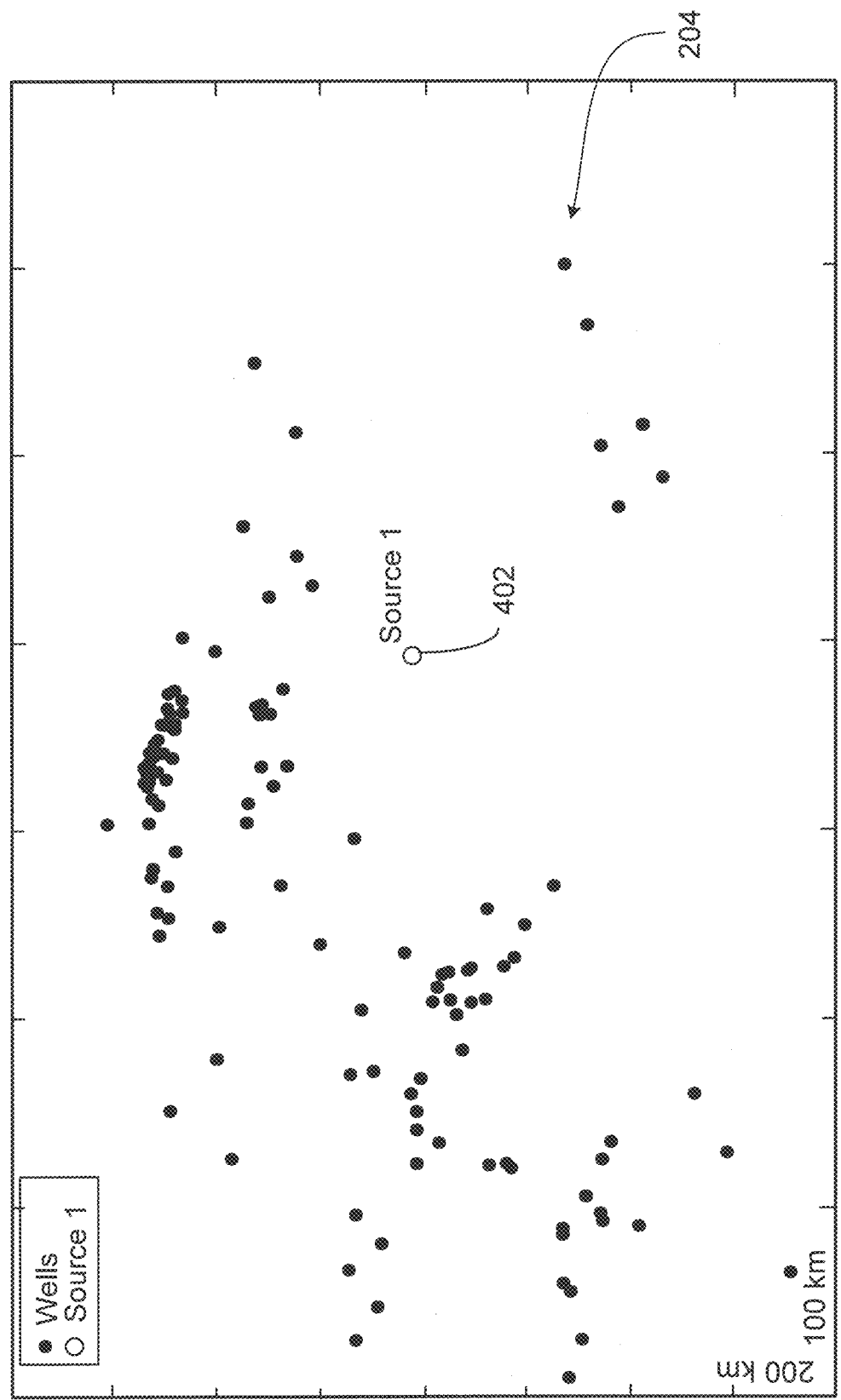
FIG. 4 is a plot with a determined source location in relation to the wells.
Figure 5:
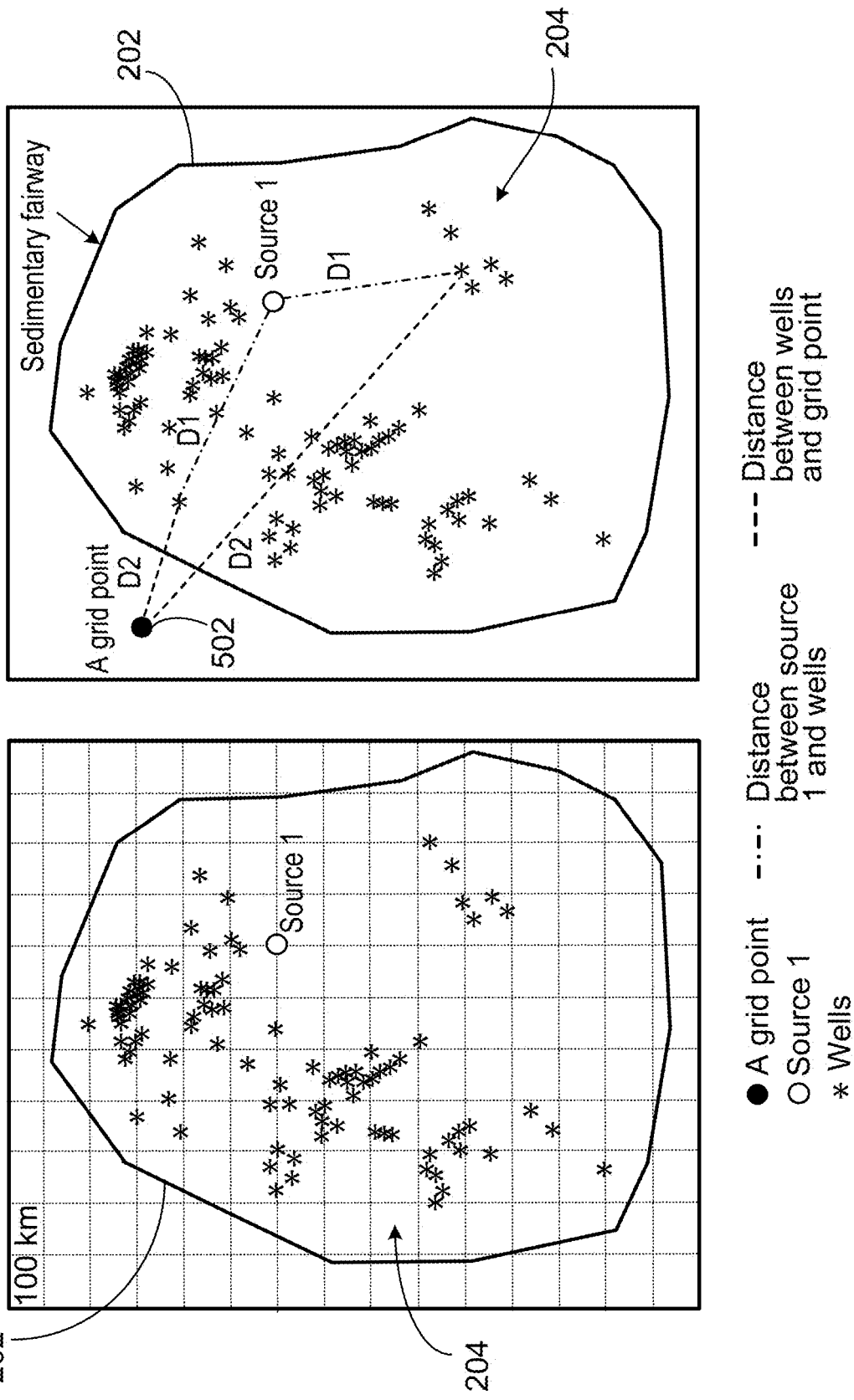
FIGS. 5A-5B are graphs of a production basin showing locations of wells and a sediment source within the basin.
Figure 6:
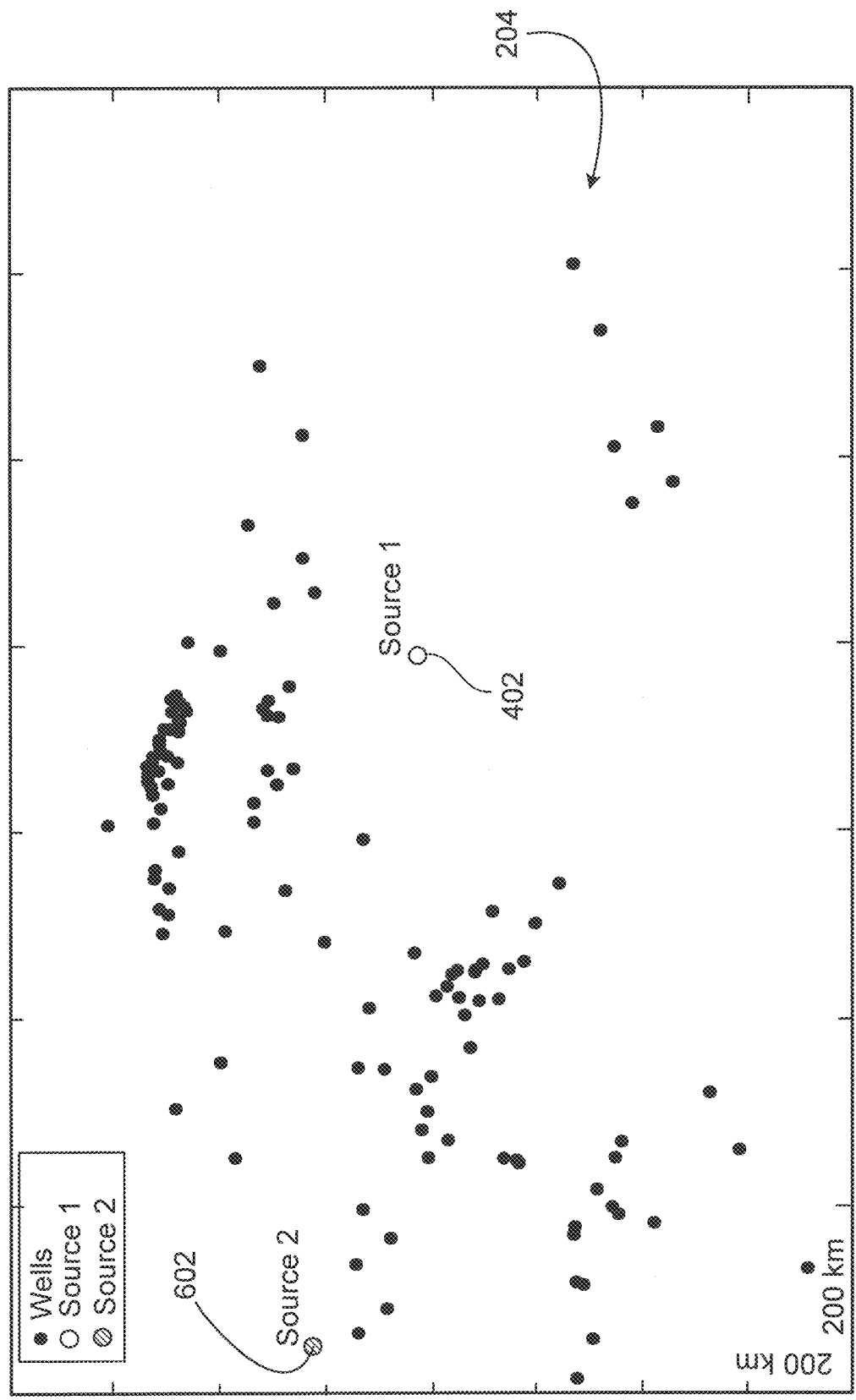
FIG. 6 is a plot with determined source locations in relation to the wells.

As shown in FIG. 4, once a best-fit curve is determined from a plot similar to FIG. 3, a first sediment source location 402 can be plotted on the same Cartesian coordinates of the grid as the wells 204. The data is fit from each grid point with equation 2 and try to find the fitting coefficients Do and a, also calculate the $R^2$ value. The $R^2$ determines the goodness of fit. The location that has the highest goodness of fit or $R^2$ is deemed as the first source. This first source is subsequently used to determine additional sources where the distance from each additional source is taken into account for each new fit to find the next best fit location that combines the first source with the potential second source. FIG. 5A illustrates a first sediment source location "Source 1" which is source location 402 plotted on FIG. 4. After a first sediment source location Source 1 is determined, the process can be repeated with a second grid point 502 to determine a second source. That is, for the same stratigraphic interval, the same set of well data can be analyzed to determine a second source location with the second grid point 502. An example of this is illustrated in FIG. 5B. The minimum distance between the first source and the potential second source is used in the analysis for each individual well and grain size to derive a new set of regression curves similar to those found in FIG. 3. Eventually, all points on the grid are tested and checked against each other to determine which point best fits the data. The same regression analysis using the dataset and Eq. 2 can be used to determine a second source location. FIG. 6 shows the second source location 602 plotted with the first source location 402 and the wells 204.

Figure 7:
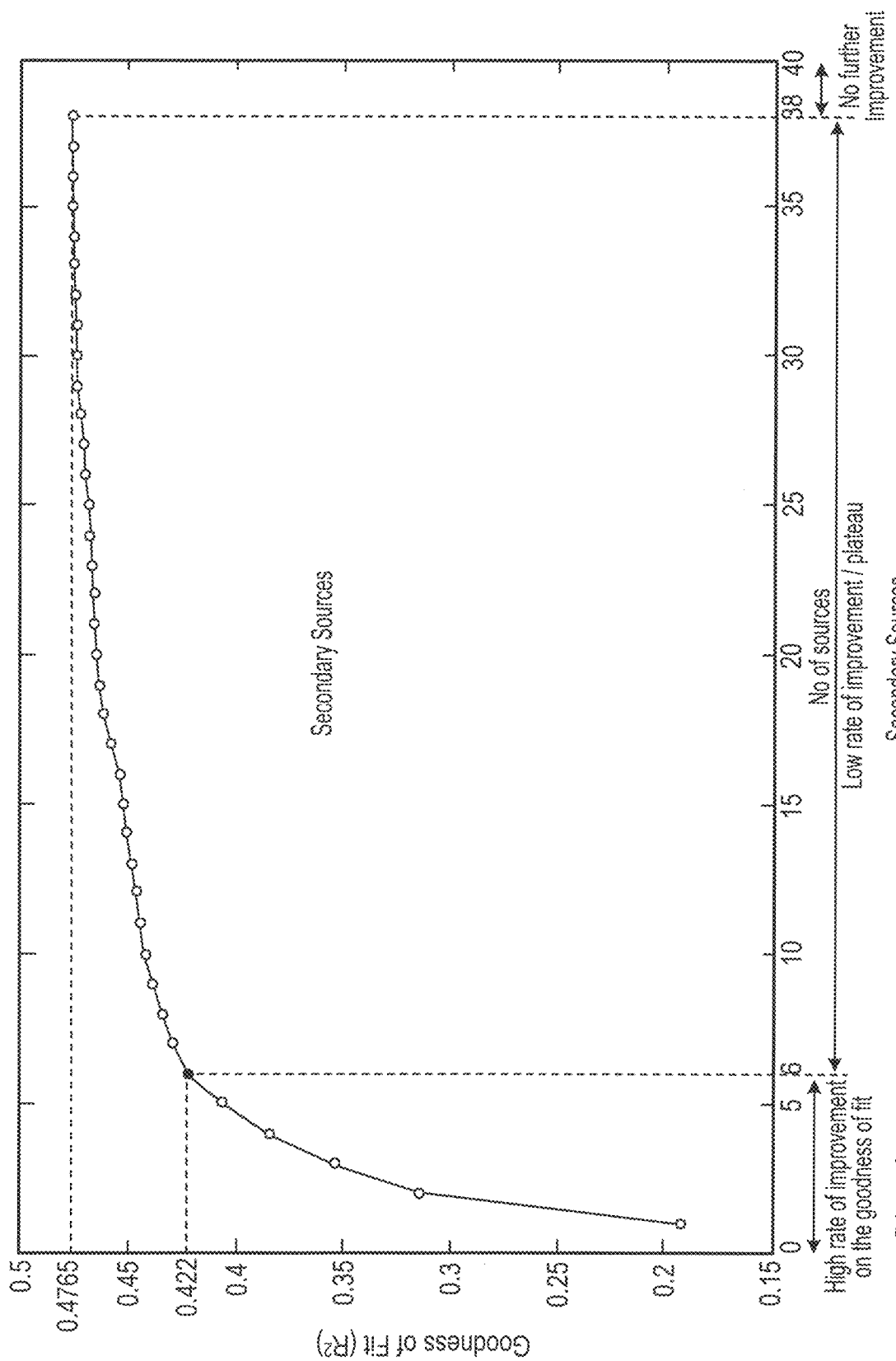
FIG. 7 is a plot with a goodness of fit vs. a number of determined sources.
Figure 8:
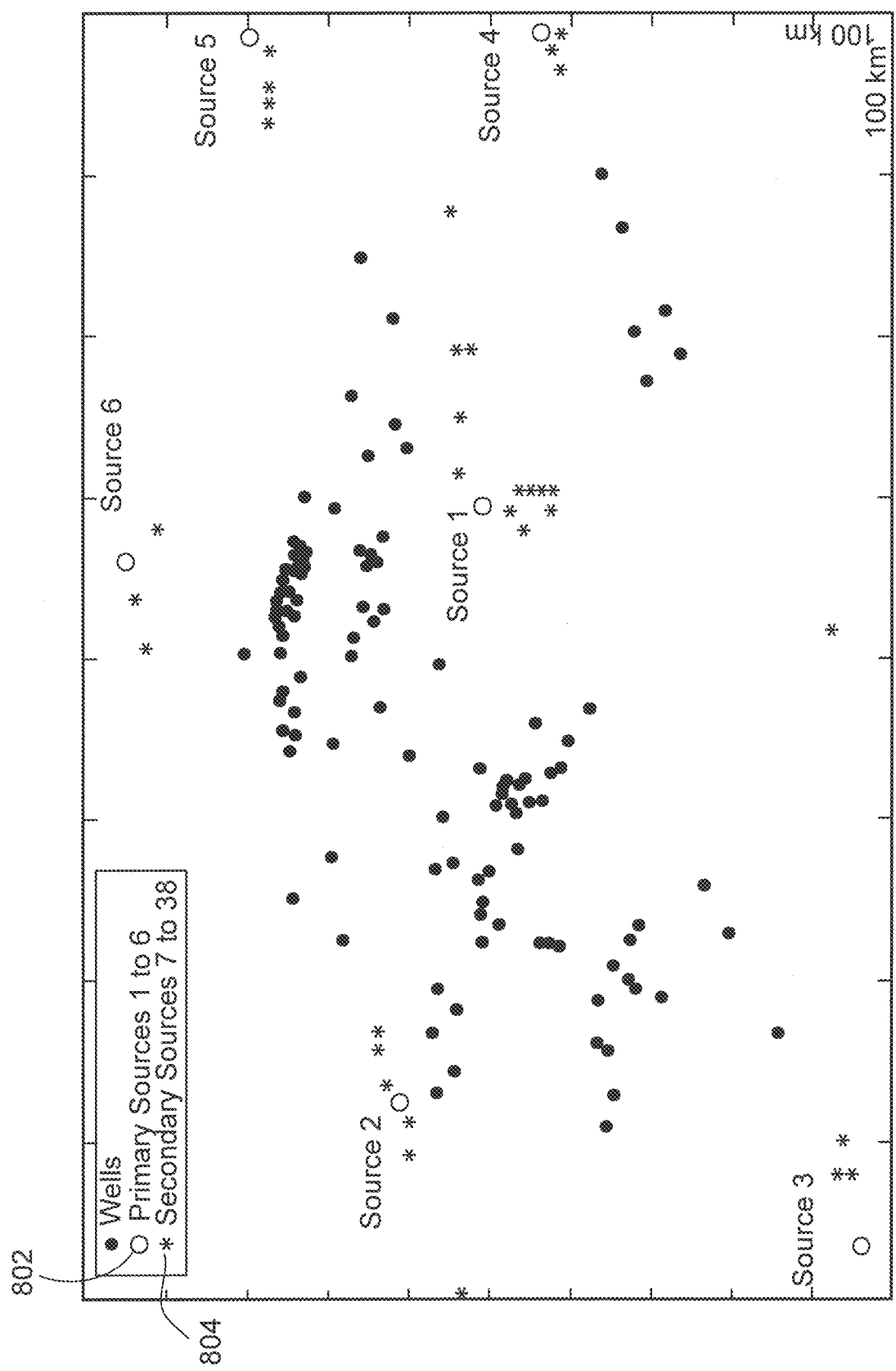
FIG. 8 is a plot with determined source locations in relation to the wells.

The process can be iterated multiple times to determine multiple source locations using the minimum distance between the determined sources and the grid locations for each individual well. FIG. 7 is a plot that shows a goodness of fit measure ($R^2$) for the number of determined sources. In this example, the first six sources show the most improvement in $R^2$ values. The $R^2$ value is a measure of how well the regression fits the data. The closer the value of $R^2$ is to 1, the better the regression represents the data. For a dataset and a fit equation, the value of $R^2$ is calculated with the following equation:

$$R^2 = 1 - \frac{\sum_i (yi - \overline{y})^2}{\sum_i (yi - fi)^2} \quad \text{(Eq. 3)}$$

where $\overline{y}$ is the mean of y data points (for example, $\overline{GS}$ from the wells), yi are individual points of the data (for example, $\overline{GS}$ at "x" distance from the source), and fi are individual points of the fitting equation (such as $D_x$) at the same x distance as points yi. These sources, plotted in FIG. 8, can be considered primary sources. The remaining sources can be considered secondary sources 804. All of the previously described sources have been determined for a single stratigraphic interval.

The same process can be used for a second stratigraphic interval after receiving a second set of well data for the plurality of wells. A second average grain size can be determined for the second stratigraphic interval within each of the wells based on the second set of received data. A second plurality of grain source locations can be iteratively determined based on the average grain sizes of the second stratigraphic interval.

In some instances, one of the primary or secondary sediment sources can be used to determine locations for hydrocarbons within the geologic formation. A well can be drilled at a location near any one of the primary sediment sources for a future production or exploratory well. In some implementations, a larger average grain size can correlate with a higher quality hydrocarbon reservoir. In some implementations, the sediment sources are not hydrocarbon sources.

Figure 9:
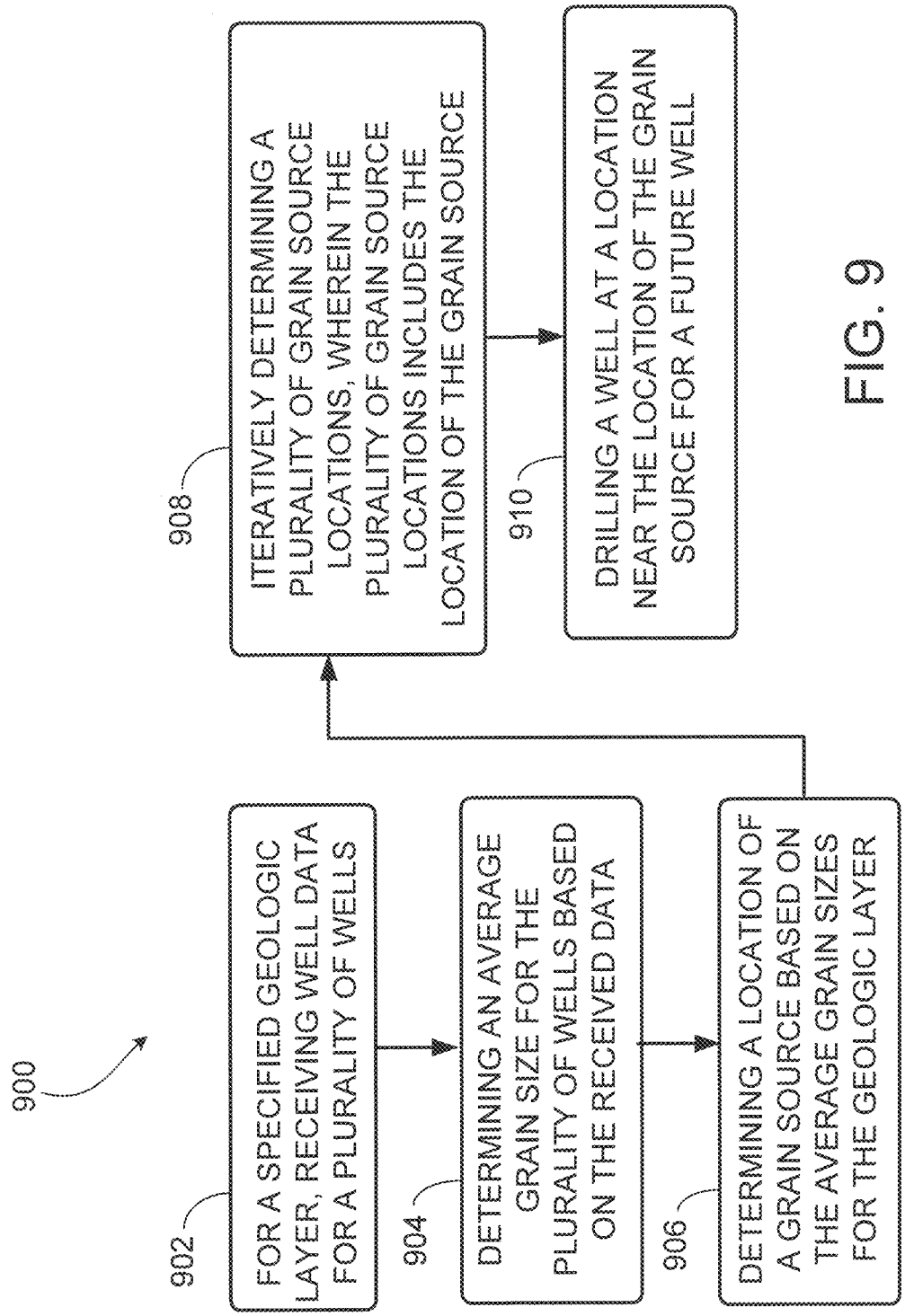
FIG. 9 is a flowchart illustrating an example method for determining a location of a sediment source.

FIG. 9 is a flowchart of a method 900 for determining a sediment source in a production basin. At 902, for a specified stratigraphic interval, well data is received for multiple wells. The well data can include a distribution of grain sizes within the well at the specified stratigraphic interval. At 904, an average grain size for each of the plurality of wells is determined based on the received data. At 906, a location of a grain source is determined based on the average grain sizes for the stratigraphic interval. At 908, multiple grain source locations are iteratively determined based on the average grain sizes of the stratigraphic interval. At 910, a well is drilled at the location of the grain source for a future well. In some instances, a similar method can be used on a second stratigraphic interval or geologic formation within the same basin utilizing the same wells. The method can be used on any number of stratigraphic intervals or geologic formations.

Implementations of the subject matter and the operations described in this disclosure can be implemented in digital electronic circuitry, or in computer software, firmware, or hardware, including the structures disclosed in this disclosure and their structural equivalents, or in combinations of one or more of them. Implementations of the subject matter described in this disclosure can be implemented as one or more computer programs, that is, one or more modules of computer program instructions, encoded on computer storage medium for execution by, or to control the operation of, data processing apparatus. Alternatively, or in addition, the program instructions can be encoded on an artificially-generated propagated signal, such as, a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (such as, multiple CDs, disks, or other storage devices).

The operations described in this disclosure can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, such as, an FPGA (field programmable gate array) or an ASIC (application-specific integrated circuit). The apparatus can also include, in addition to hardware, code that creates an execution environment for the computer program in question, such as, code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing, and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (such as, one or more scripts stored in a markup language document), in a single file dedicated to the program in question, or in multiple coordinated files (such as, files that store one or more modules, sub-programs, or portions of code). A computer program can be deployed to be executed on one computer or on multiple computers that are located at one site or distributed across multiple sites and interconnected by a communication network.

The processes and logic flows described in this disclosure can be performed by one or more programmable processors executing one or more computer programs to perform actions by operating on input data and generating output. The processes and logic flows can also be performed by, and apparatus can also be implemented as, special purpose logic circuitry, such as, an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, such as, magnetic, magneto-optical disks, or optical disks. However, a computer need not have such devices. Moreover, a computer can be embedded in another device, such as, a mobile telephone, a personal digital assistant (PDA), a mobile audio or video player, a game console, a Global Positioning System (GPS) receiver, or a portable storage device (such as, a universal serial bus (USB) flash drive), to name just a few. Devices suitable for storing computer program instructions and data include all forms of non-volatile memory, media and memory devices, including by way of example semiconductor memory devices, such as, EPROM, EEPROM, and flash memory devices; magnetic disks, such as, internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this disclosure can be implemented on a computer having a display device, such as, a CRT (cathode ray tube) or LCD (liquid crystal display) monitor, for displaying information to the user and a keyboard and a pointing device, such as, a mouse or a trackball, by which the user can provide input to the computer. Other kinds of devices can be used to provide for interaction with a user as well; for example, feedback provided to the user can be any form of sensory feedback, such as, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this disclosure can be implemented in a computing system that includes a back-end component, such as, a data server, or that includes a middleware component, such as, an application server, or that includes a front-end component, such as, a client computer having a graphical user interface or a Web browser through which a user can interact with an implementation of the subject matter described in this disclosure, or any combination of one or more such back-end, middleware, or front-end components. The components of the system can be interconnected by any form or medium of digital data communication, such as, a communication network. Examples of communication networks include a local area network ("LAN") and a wide area network ("WAN"), an inter-network (such as, the Internet), and peer-to-peer networks (such as, ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (such as, an HTML page) to a client device (such as, for purposes of displaying data to and receiving user input from a user interacting with the client device). Data generated at the client device (such as, a result of the user interaction) can be received from the client device at the server.

Figure 10:
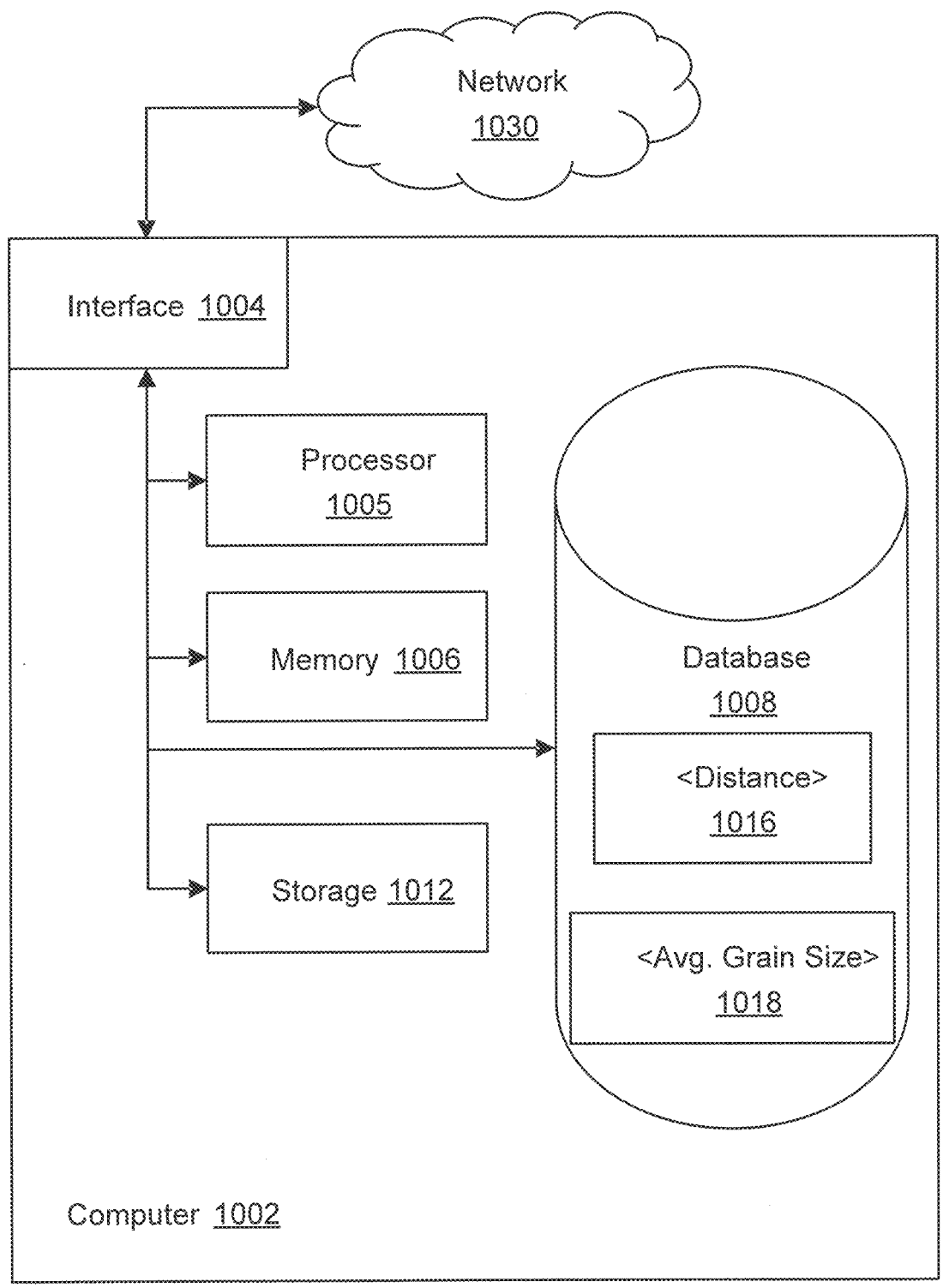
FIG. 10 is a block diagram of a general purpose computer that can be used to execute aspects of the disclosure.

An example of one such type of system is shown in FIG. 10, which shows a block diagram of a programmable computer 1002 suitable for performing methods of various aspects of the subject matter described in this disclosure. The computer 1002 includes a processor 1005, a memory (RAM) 1006 that can include random access memory, a program memory (for example, a writable read-only memory (ROM) such as a flash ROM), or any other computer readable memory, a storage device 1012, such as a hard-disk drive, solid-state drive, or any other form of storage medium. The computer 1002 can be preprogrammed, in ROM, for example, or it can be programmed (and reprogrammed) by loading a program from another source (for example, from a floppy disk, a CD-ROM, or another computer). The components of the computer 1002 can be interconnected through an interface 1004 by any form or medium of digital data communication, such as, a communication network 1030. Examples of communication networks include a local area network ("LAN") and a wide area network ("WAN"), an inter-network (such as, the Internet), and peer-to-peer networks (such as, ad hoc peer-to-peer networks). Data-types, such as a distance datatype 1016 and an average grain size datatype 1018, can be stored on the computer 1002 or remotely in a database 1008.

While this disclosure contains many specific implementation details, these should not be construed as limitations on the scope or of what may be claimed, but rather as descriptions of features specific to particular implementations. Certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method, comprising:
    for a stratigraphic interval, receiving well data obtained from a plurality of wells;
    determining an average grain size for each of the plurality of wells based on the received well data;
    plotting a location for each of the plurality of wells on a grid, wherein each of a plurality of points on the grid corresponds to a potential grain source location;
    determining a location of a grain source in the stratigraphic interval based on comparing goodness of fit of exponential decay curves of grain size as a function of distance from each of the plurality of points to the plurality of wells, wherein each fitted exponential decay curve represents the best fit from each of the plurality of points to the plurality of wells using the average grain size of each of the plurality of wells through curve fitting for the stratigraphic interval and the curve fitting determines the initial grain size for each of the plurality of points;
    and drilling a well at a future well location determined by evaluating the future well location with respect to the location of the grain source.

2. The method of claim 1, wherein determining an average grain size for each well comprises determining ratios of each of a plurality of grain size classes in the stratigraphic interval.

3. The method of claim 2, wherein the ratios of each of the plurality of grain size classes is determined based on a total thickness of grains of that grain size class divided by a total thickness of the stratigraphic interval.

4. The method of claim 1, further comprising iteratively determining a plurality of grain source locations based on the average grain sizes of the stratigraphic interval, wherein the plurality of grain source locations includes the location of the grain source.

5. The method of claim 1, wherein the plurality of wells comprises at least thirty wells.

6. A non-transitory computer readable medium storing instructions to cause a processor to perform operations comprising:
    for a stratigraphic interval, receiving well data obtained from a plurality of wells;
    determining an average grain size for each of the plurality of wells based on the received well data;
    plotting a location each of the plurality of wells on a grid, wherein each of a plurality of points on the grid corresponds to a potential grain source location;
    determining a location of a grain source in the stratigraphic interval based on comparing goodness of fit of exponential decay curves of grain size as a function of distance from each of the plurality of points to the plurality of wells, wherein each fitted exponential decay curve represents the best fit from each of the plurality of points to the plurality of wells using the average grain size of each of the plurality of wells through curve fitting for the stratigraphic interval and the curve fitting determines the initial grain size for each of the plurality of points;

and identifying a future location determined by evaluating the future well location with respect to the location of the grain source, wherein a well is drilled at the future well location by a wellbore drilling assembly.

7. The computer readable medium of claim 6, wherein determining an average grain size for each well comprises determining ratios of each of a plurality of grain size classes in the stratigraphic interval.

8. The computer readable medium of claim 7, wherein the ratios of each of the plurality of grain size classes is determined based on a total thickness of grains of that grain size divided by a total thickness of the stratigraphic interval.

9. The computer readable medium of claim 8, further comprising iteratively determining a plurality of grain source locations based on the average grain sizes of the stratigraphic interval, wherein the plurality of grain source locations includes the location of the grain sources.

10. The computer readable medium of claim 8, wherein the plurality of wells comprises at least thirty wells.

11. A method comprising:
for a stratigraphic interval, receiving well data obtained from a plurality of wells;
determining an average grain size for each of the plurality of wells based on the received well data;
plotting a location each of the plurality of wells on a grid, wherein each of a plurality of points on the grid corresponds to a potential grain source location;
determining a first location of a grain source in the stratigraphic interval based on comparing goodness of fit of exponential decay curves of grain size a function of distance from each of the plurality of points to the plurality of wells, wherein each fitted exponential decay curve represents the best fit from each of the plurality of points to the plurality of wells using the average grain size of each of the plurality of wells through curve fitting for the stratigraphic interval and the curve fitting determines the initial grain size for each of the plurality of points;
iteratively determining a plurality of grain source locations in the stratigraphic interval based on comparing goodness of fit of exponential decay curves of grain size a function of distance from each of the plurality of points to the plurality of wells, wherein each fitted exponential decay curve represents the best fit from each of the plurality of points to the plurality of wells using the average grain size of each of the plurality of wells through curve fitting for the stratigraphic interval and the curve fitting determines the initial grain size for each of the plurality of points, wherein the plurality of grain source locations include the first location of the grain source;
and drilling a well at a future well location determined by evaluating the future well location with respect to the location of the grain source.

12. The method of claim 11, wherein determining an average grain size for each well comprises determining ratios of each of a plurality of grain size classes in the stratigraphic interval.

13. The method of claim 11, wherein the plurality of wells comprises at least thirty wells.

14. The method of claim 11, further comprising:
for a second stratigraphic interval, receiving a second set of well data for the plurality of wells;
determining a second average grain size for each of the plurality of wells based on the received data;
iteratively determining a second plurality of grain source locations based on the average grain size of the second stratigraphic interval, wherein the plurality of grain source locations includes the location of the grain source; and
drilling a well at a location near the location of the second grain source for a future well.

15. The method of claim 11, wherein determining an average gain size for each of the plurality of wells comprises assuming an initial grain size prior to iteratively determining a plurality of grain source locations.

16. The method of claim 2, wherein the ratios of each of a plurality of grain size classes is based on particle count.

17. The method of claim 4, wherein the plurality of grain sources are all within the same stratigraphic interval.

* * * * *

UNITED STATES PATENT AND TRADEMARK OFFICE
CERTIFICATE OF CORRECTION

Page 1 of 1

PATENT NO. : 11,199,640 B2
APPLICATION NO. : 15/670605
DATED : December 14, 2021
INVENTOR(S) : Michael et al.

It is certified that error appears in the above-identified patent and that said Letters Patent is hereby corrected as shown below:

In the Claims

Column 11, Line 22, Claim 9, delete "claim 8" and insert -- claim 6 --;

Column 11, Line 27, Claim 10, delete "claim 8" and insert -- claim 6 --.

Signed and Sealed this
Fifth Day of April, 2022

Drew Hirshfeld
*Performing the Functions and Duties of the
Under Secretary of Commerce for Intellectual Property and
Director of the United States Patent and Trademark Office*